(12) United States Patent
Lai

(10) Patent No.: US 11,954,959 B2
(45) Date of Patent: Apr. 9, 2024

(54) BIOMETRIC LOCK

(71) Applicant: The Sun Lock Company Limited, Tuen Mun (HK)

(72) Inventor: Karl Lai, Tai Po (HK)

(73) Assignee: THE SUN LOCK COMPANY LIMITED, Hong Kong (HK)

( * ) Notice: Subject to any disclaimer, the term of this patent is extended or adjusted under 35 U.S.C. 154(b) by 0 days.

(21) Appl. No.: 17/885,750

(22) Filed: Aug. 11, 2022

(65) Prior Publication Data

US 2023/0089763 A1 Mar. 23, 2023

Related U.S. Application Data

(60) Provisional application No. 63/247,522, filed on Sep. 23, 2021.

(51) Int. Cl.
*G07C 9/37* (2020.01)
*G07C 9/00* (2020.01)
(Continued)

(52) U.S. Cl.
CPC ........... *G07C 9/37* (2020.01); *G07C 9/00563* (2013.01); *E05B 47/00* (2013.01); *E05B 67/22* (2013.01);
(Continued)

(58) Field of Classification Search
CPC ...... E05B 37/025; E05B 35/105; E05B 37/00; E05B 37/0034; E05B 37/0058; E05B 37/02; E05B 39/00; E05B 67/32; E05B 67/22; E05B 2035/009; E05B 47/0012; E05B 63/0056; E05B 17/0087; E05B 17/2026;
(Continued)

(56) References Cited

U.S. PATENT DOCUMENTS 6,373,967 B2 4/2002 Pu et al.
6,927,671 B2 8/2005 DeBono
(Continued)

FOREIGN PATENT DOCUMENTS

CN 105888403 A 8/2016
CN 207212034 U 4/2018
(Continued)

OTHER PUBLICATIONS

International Search Report dated Dec. 17, 2022 issued in corresponding international patent application PCT/CN2022/119760.

*Primary Examiner* — Dionne Pendleton
(74) *Attorney, Agent, or Firm* — Ware, Fressola, Maguire & Barber LLP

(57) ABSTRACT

A biometric lock comprising a lock body, a shackle with a long leg and a short leg, wherein the long leg of the shackle never comes out of the lock, and a fingerprint panel wherein the fingerprint panel and an associated memory, battery, and processor are configured to associate a fingerprint of a user to one of a plurality of lock control levels, said associated fingerprint considered a registered fingerprint, wherein each lock control level allows an associated lock control level user to unlock said lock, the lock including a driving electronic circuit, electro-mechanical control motor, and a latch, that are configured to unlock the lock if a registered fingerprint is placed on said fingerprint panel.

18 Claims, 6 Drawing Sheets

(51) Int. Cl.
*E05B 47/00* (2006.01)
*E05B 67/22* (2006.01)
*G06F 21/32* (2013.01)

(52) U.S. Cl.
CPC .... *G06F 21/32* (2013.01); *G07C 2009/00849* (2013.01); *G07C 2209/04* (2013.01)

(58) Field of Classification Search
CPC ........... E05B 17/226; E05B 2047/0017; E05B 2047/0024; E05B 2047/0025; E05B 2047/0036; E05B 2047/0058; E05B 2047/0067; E05B 2047/0069; E05B 2047/0086; E05B 2047/0094; E05B 2047/0095; E05B 2063/0026; E05B 35/00; E05B 37/16; E05B 47/00; E05B 47/026; E05B 47/06; E05B 47/0607; E05B 67/003; E05B 67/02; E05B 67/06; E05B 67/063; E05B 9/02; E05B 47/0002; G07C 2209/02; G07C 2209/04; G07C 9/00563; G07C 9/37; G07C 2009/00793; G07C 2209/63; G07C 9/00571; G07C 9/0069; G07C 9/00698; G07C 9/00896; G07C 9/00944; G07C 9/23; G07C 9/257; G07C 9/33; G07C 9/38; Y10T 70/409; Y10T 70/417; Y10T 70/422; Y10T 70/45; Y10T 70/459; Y10T 70/461; Y10T 70/489; Y10T 70/7113; Y10T 70/7124; G06V 40/13; G06V 40/50; E05Y 2201/10; E05Y 2400/612; E05Y 2400/664; E05Y 2400/86; A61J 1/03; A61J 1/1412; A61J 1/1437; A61J 2200/30; A61J 2200/74; A61J 7/0076; A61J 7/0418; A61J 7/0436; A61J 7/0481; B65D 41/026; B65D 47/08; B65D 50/00; B65D 55/02; B65D 55/14; G06K 15/00; G06K 15/005; G06F 21/32; G06F 21/608; G06F 3/04883

See application file for complete search history.

(56) References Cited

U.S. PATENT DOCUMENTS

| | | |
|---|---|---|
| D519,356 S | 4/2006 | Osiecki et al. |
| D581,245 S | 11/2008 | Conway |
| D581,246 S | 11/2008 | Conway |
| 7,525,411 B2 | 4/2009 | Strader et al. |
| 7,734,068 B2 | 6/2010 | Fisher |
| 7,899,219 B2 | 3/2011 | Slevin |
| 7,903,846 B2 | 3/2011 | Fisher |
| 7,908,896 B1 | 3/2011 | Olson et al. |
| 10,445,961 B1 | 10/2019 | Chen |
| 10,553,053 B2 | 2/2020 | Chen |
| 10,572,639 B2 | 2/2020 | Ranjit et al. |
| 10,872,482 B1* | 12/2020 | Colton ............... B65D 55/14 |
| D906,785 S | 1/2021 | Kinas et al. |
| 2010/0027045 A1* | 2/2010 | Moore ............... G06K 15/00 358/1.14 |
| 2020/0291684 A1* | 9/2020 | Kinas ............... G07C 9/00944 |
| 2022/0198863 A1* | 6/2022 | Ho ............... G07C 9/00571 |

FOREIGN PATENT DOCUMENTS

| | | |
|---|---|---|
| CN | 109790727 A | 5/2019 |
| CN | 110047177 A | 7/2019 |
| CN | 209908166 U | 1/2020 |
| CN | 210178134 U | 3/2020 |
| WO | 2019047494 A1 | 3/2019 |

* cited by examiner

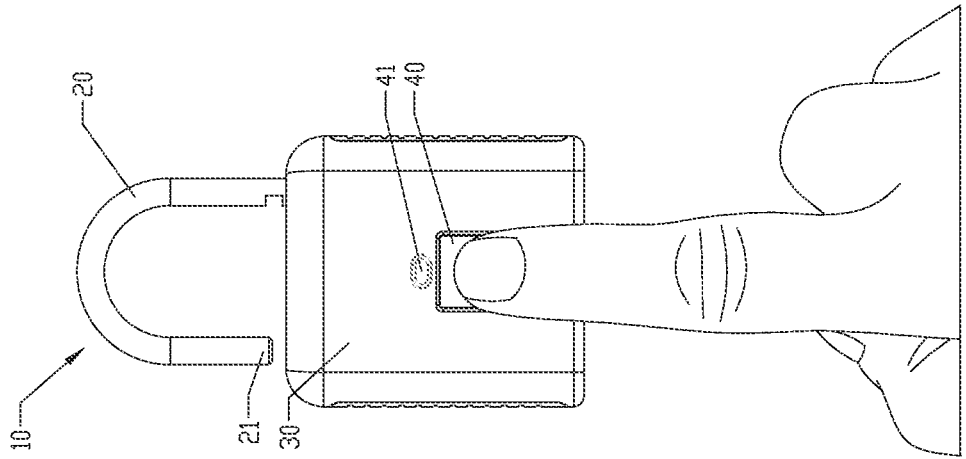
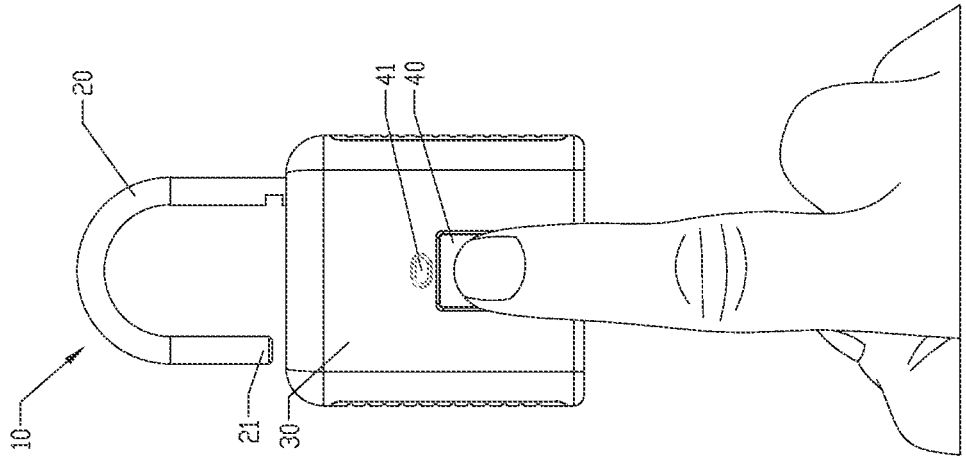
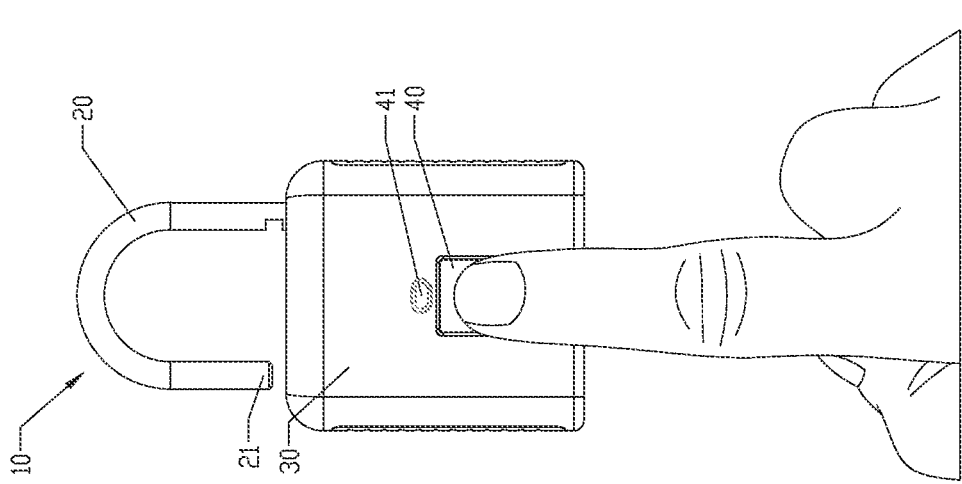

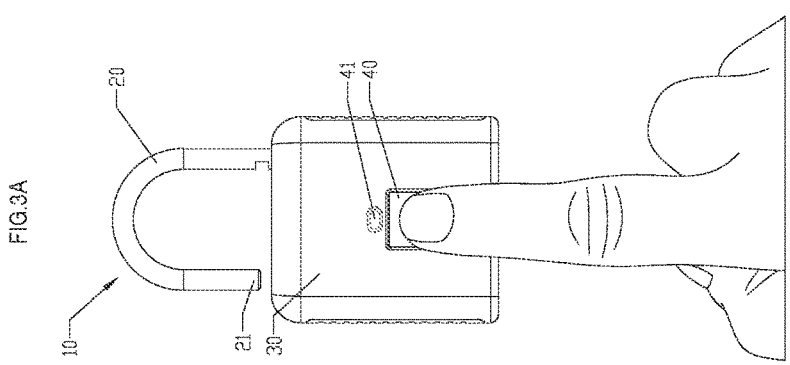
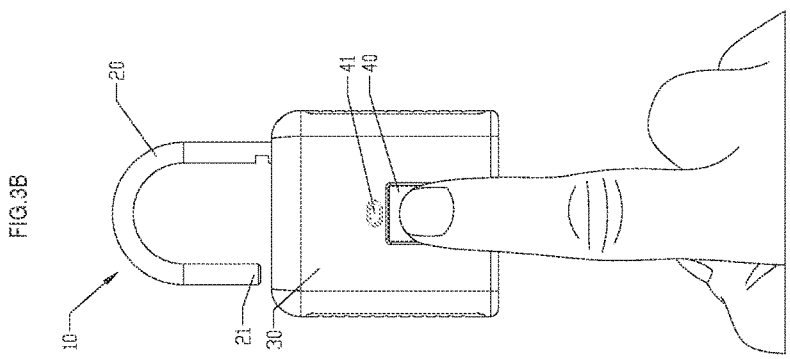
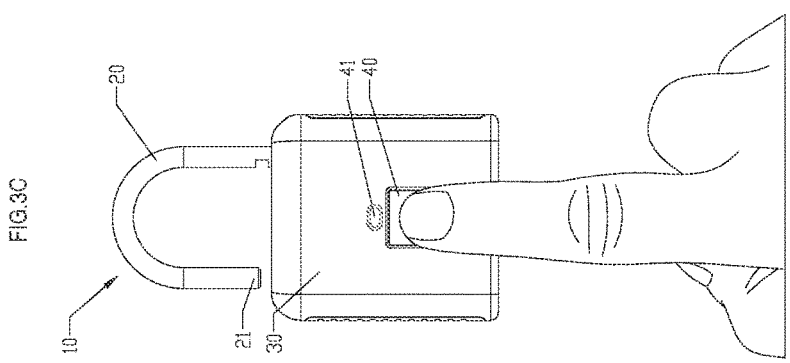
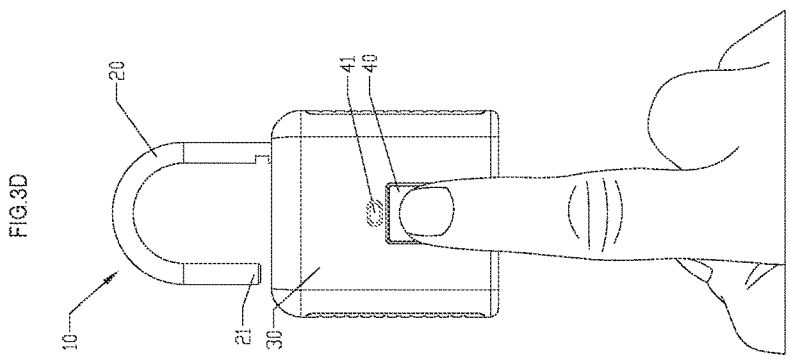

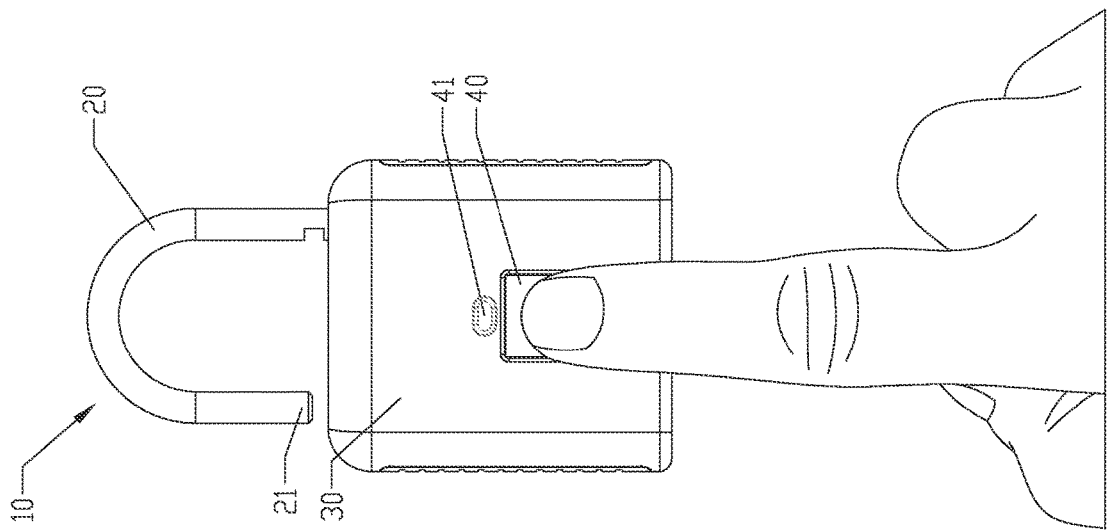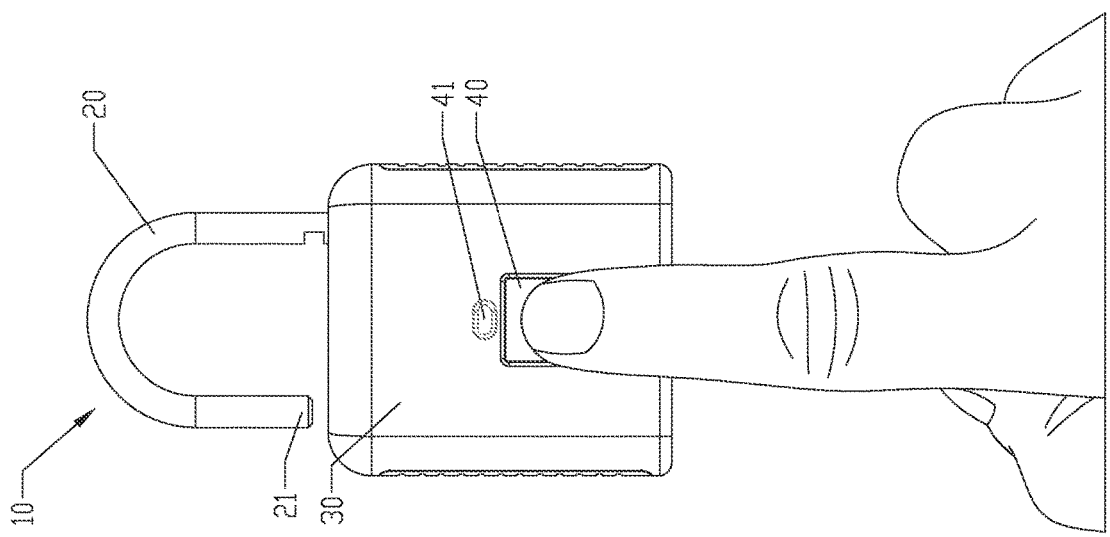

BIOMETRIC LOCK

CROSS-REFERENCE TO RELATED APPLICATION

This application claims benefit to U.S. Provisional Application No. 63/247,522 filed Sep. 23, 2021, which application is incorporated by reference in its entirety.

TECHNICAL FIELD

The present invention relates to padlocks having a biometric feature to provide different levels of user control of the padlock.

BACKGROUND OF THE INVENTION

There are many biometric locks on the market wherein the registration of a fingerprint associated with administrator lock control level of the lock only allows one particular fingerprint (for example, only the right thumb) to be set as an administrator fingerprint during the first registration of the biometric lock. The problem occurs when that particular fingerprint is damaged (altered in some way, such as a callous or cut) then there may be no way to regain access control of the lock. Some biometric locks may have the first two registrations to be the administrator lock control level fingerprint; however, these two registrations still require one fingerprint per registration. This means a maximum of two fingerprints for administrator fingerprints.

SUMMARY OF THE INVENTION

To overcome this situation, a new biometric lock according to the present invention allows during the setup of the administrator lock control level to store a maximum of 5 fingerprints for the initial registration. Thus, an administrator lock control level user could setup 5 different fingerprints to control the lock and also to open the lock for a single initial registration. For normal (secondary) users of the biometric lock, this new biometric lock could store 5 different fingerprints per each registration. The new biometric lock could also store some other number of fingerprints, such as 10 registrations. The first registration is for an administrator lock control level user fingerprint. Each registration can have a maximum of 5 different fingerprints. This means that the biometric lock can store up to 100 different fingerprints for these 10 registrations. This is 10 times more than available on prior art devices. The prior art devices can generally only store 1 fingerprint per each registration.

An embodiment of the present invention comprises a lock body, a shackle a shackle with a long leg and a short leg, wherein the long leg of the shackle never comes out of the lock, and a fingerprint panel wherein the fingerprint panel and an associated memory, battery, and processor are configured to associate a fingerprint of a user to one of a plurality of lock control levels, said associated fingerprint considered a registered fingerprint, wherein each lock control level allows an associated lock control level user to unlock said lock, the lock including a driving electronic circuit, electro-mechanical control motor, and a latch, that are configured to unlock the lock if a registered fingerprint is placed on said fingerprint panel.

In another embodiment of the present invention, the above biometric lock has a highest lock control level that is an administrator lock control level that allows an associated user lock control level to perform administrative tasks, including associating fingerprints to lock control levels.

In a further embodiment of the present invention, the permanent lock control level requires a user associated with the administrator lock control level to associate a user's fingerprint with the permanent lock level control.

In another embodiment of the present invention, the administrator lock control level allows a plurality of different fingerprints to be associated to lock control levels.

In a further embodiment of the present invention, the administrator lock control level allows up to five fingerprints to be assigned to lock control levels.

In another embodiment of the present invention, the administrator lock control level only allows one fingerprint to be associated with said administrative lock control level.

In a still further embodiment of the present invention, a permanent lock level control allows an associated user to access the biometric lock, but does not allow said user to associate a new fingerprint of another associated user with any lock control level.

In another embodiment of the present invention, the permanent lock control level allows an associated lock control level user to register different fingerprints for said permanent lock control level.

In a further embodiment of the present invention, the permanent lock control level allows an associated lock control level user to register the same fingerprints per each registration.

In another embodiment of the present invention, the administrator lock control level is the only lock control level that allows an associated lock control level user to erase fingerprints of associated lock control level users of any lock control level.

In another embodiment of the present invention, the biometric lock has a plurality of lock control levels, wherein the biometric lock has 10 registration spaces that can be associated with 10 fingerprints, wherein the first person to register a fingerprint is associated with the administrative lock control level.

In a still further embodiment of the present invention, the registration of a user to be associated with the administrator lock control level allows more than 1 fingerprint of said user to be associated with the administrative lock control level.

In another embodiment of the present invention, the biometric lock has more than 1 registration space that can be associated with fingerprints.

In a further embodiment of the present invention, a secondary lock control level only allows an associated lock control level user to unlock the biometric lock, but does not allow said associated lock control level user to allow others to be associated with any lock control level.

In a still further embodiment of the present invention, the secondary lock control level does not allow an associated lock control level user to delete a fingerprint of any associated user of any lock control level.

In another embodiment of the present invention, the fingerprint panel includes indicator lights and wherein the memory, battery and processor are configured to associate at least one fingerprint with an administrator lock control level by placing any fingerprint on the panel so that the biometric lock will open and the indicating light will have a green light on, pressing and holding the fingerprint for 5 seconds until a blue light turns on, registering a first fingerprint for an administrator lock control level user's fingerprint and the blue light will blink, wherein a red light will blink if the setting failed, and, if desired, registering a second fingerprint for the administrator lock control level user's fingerprint and the blue light will blink, wherein a red light will blink if the setting failed, and, if desired, registering a third fingerprint for the administrator lock control level user's fingerprint and the blue light will blink, wherein a red light will blink if the setting failed, and, if desired, registering a fourth fingerprint for the administrator lock control level user's fingerprint and the blue light will blink, wherein a red light will blink if the setting failed, and further, if desired, registering the final fingerprint for the administrator lock control level user's fingerprint and the blue light will blink, wherein a red light will blink if the setting failed, and after these registrations, a green light will turn on to indicate the registration is successfully completed.

In a further embodiment of the present invention, the memory, battery and processor are configured to register a secondary user fingerprint by placing the registered administrator lock control level user's fingerprint on the panel and the biometric lock will open and turn on indicating green light, keeping the finger pressed and hold the registered administrator lock control level user's fingerprint for 5 seconds until the blue light turns on, wherein the administrator lock control level user then needs to place the registered administrator lock control level user's fingerprint on the panel again and the blue light will start blinking, letting a normal (secondary) lock control level user register a first fingerprint for a normal user fingerprint and the blue light will blink, wherein a red light will blink if setting failed, and, if desired, the normal user may register a second fingerprint for a normal user fingerprint and the blue light will blink, wherein a red light will blink if the setting failed, and, if desired, the normal user may register a third fingerprint for normal user fingerprint and the blue light will blink, wherein a red light will blink if the setting failed, and, if desired, the normal user may register a fourth fingerprint for normal user fingerprint and the blue light will blink, wherein a red light will blink if the setting failed, and, further, if desired, the normal user may register a final fingerprint for normal user fingerprint and the blue light will blink, wherein a red light will blink if the setting failed, and after these registrations, a green light will turn on to indicate the registration is successfully completed.

In another embodiment of the present invention, the fingerprint panel, memory, battery, processor, driving electronic circuit, electro-mechanical control motor and latch are configured to open the lock by sensing a registered user's fingerprint on the fingerprint panel so as to cause said latch to open the lock.

In a still further embodiment of the present invention, the indicator lights indicate the status of the lock.

BRIEF DESCRIPTION OF THE DRAWINGS

FIGS. 2A-2C show steps associated with administrator user registration of the lock.

FIGS. 3A-3D show steps associated with normal user (secondary user) operation of the lock.

FIGS. 4A-4B show steps associated with resetting the lock to completely erase all fingerprints associated with the lock.

DETAILED DESCRIPTION (FIGS. 1-5)

Figure 1:
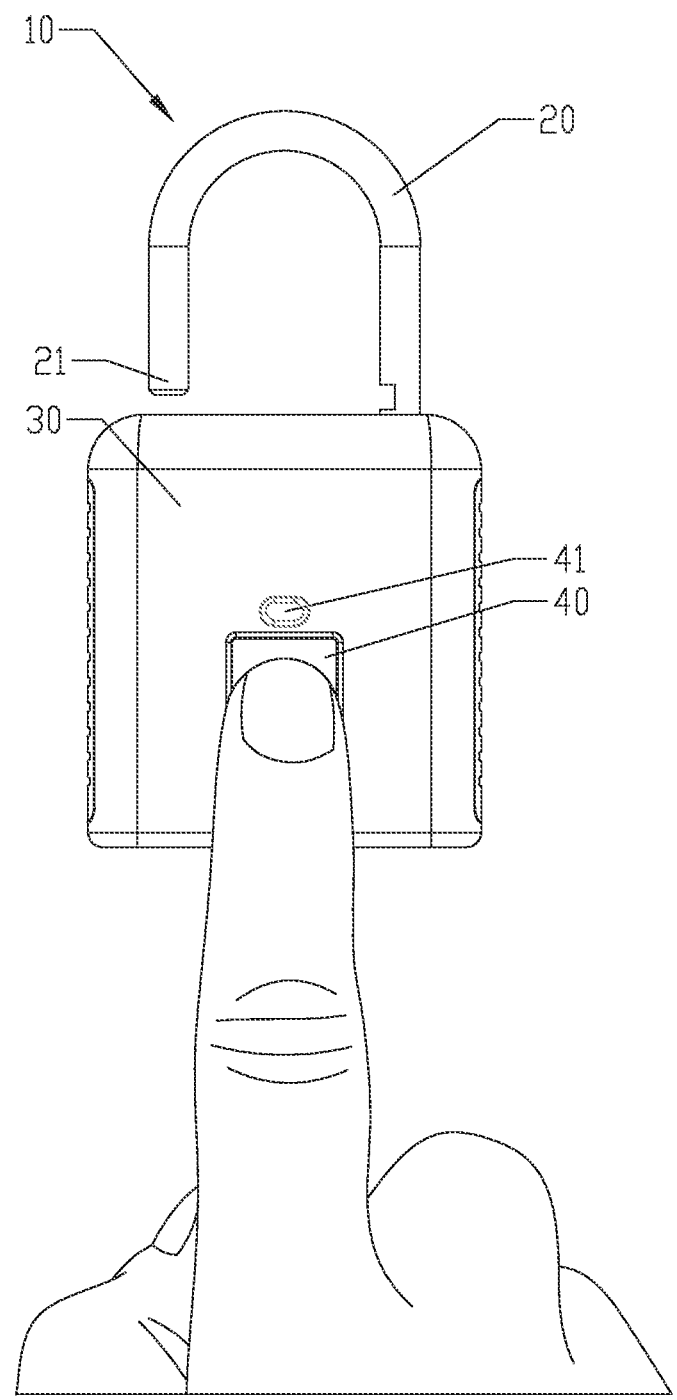
FIG. 1 is a front view of the biometric lock showing the lock in an open configuration and also illustrating a user's finger over a fingerprint panel of the lock and further showing the indicating light of the lock that can change colors to annunciate the status of the lock.

Components:
- 10. Padlock (lock)
- 20. Shackle
- 21. Short leg shackle that extends out of lock body when lock open
- 22. Cut-out
- 30. Body
- 40. Fingerprint Panel
- 41. Indicating Lights (Red, Blue, Green)
- 500 Memory
- 510 Battery
- 520 Processor
- 530 Driving Electronic Circuit
- 540 Electro-Mechanical Control Motor
- 550 Latch.

Operating Instructions (Set Administrator User's Fingerprint Setting):

Administrator User (Primary User) Instructions for Initial Setting (Registration) to Associate a User to the Administrator Lock Control Level (FIGS. 2A-2C):

Terminology

In the following, the term "registration" means associating a user's fingerprint to a lock control level. The biometric lock has at least an administrator lock control level that allows an associated user to have maximum control with respect to the biometric lock as well as one or more secondary lock control levels that allows an associated user more limited control with respect to the biometric lock. Such secondary lock control levels include a permanent lock control level that can allow an associated user to access (open) the biometric lock but does not allow the associated user to associate (register) a new fingerprint of another associated user with respect to any lock control level.

A permanent lock control level is a secondary lock control level that may be configured to allow an associated user to register (associate) different fingerprints for the permanent lock control level.

The permanent lock control level may also be configured to allow an associated user to register different fingerprints to be associated with the permanent lock control level.

The permanent lock control level may also be configured to allow an associated user to register the same fingerprint(s) per each registration of the biometric lock. In addition, the administrator lock control level may be configured as the only lock control level that allows an associated user to erase fingerprints of associated users of any lock control level.

The biometric lock may be configured so that a secondary lock control level only allows an associated user to unlock the biometric lock, but does not allow the associated user to allow others to be associated with any lock control level.

The biometric lock may also be configured so that a secondary lock control level does not allow an associated user to delete a fingerprint of any associated user of any lock control level.

Steps for Administrator User Registration (FIGS. 2A-2C):
1. place any fingerprint on the panel 40 so that the biometric lock 10 will open and the indicating light 41 will have green light on.
2. press and hold the fingerprint for 5 seconds until blue light 41 turns on (as shown in FIG. 2A).
3. register a first fingerprint for an administrator lock control level user's fingerprint and the blue light will blink as shown in FIG. 2B (red light 41 will blink if the setting failed). For example, let us say it is the administrator lock control level user's right thumb.

4. If desired, register the second fingerprint for the administrator lock control level user's fingerprint and the blue light will blink (red light 41 will blink if the setting failed). For example, let us say it is the administrator lock control level user's right index.

5. If desired, register the third fingerprint for the administrator lock control level user's fingerprint and the blue light will blink (red light 41 will blink if the setting failed). For example, let us say it is the administrator lock control level user's middle finger.

6. If desired, register the fourth fingerprint for the administrator lock control level user's fingerprint and the blue light will blink (red light 41 will blink if the setting failed). For example, let us say it is the administrator lock control level user's no-name (ring) finger.

7. If desired, register the final fingerprint for the administrator lock control level user's fingerprint and the blue light will blink (red light 41 will blink if the setting failed). For example, let us say it is the administrator lock control level user's left thumb.

8. After these registrations, a green light will turn on to indicate the registration is successfully completed, as shown in FIG. 2C.

Based on above steps 1-8, the administrator lock control level user could register different fingerprints in a single registration. Each registration allows up to 5 times to register the fingerprints, and the administrator lock control level user can have five different fingerprints associated with the administrative lock control level. This is very convenient to the primary user (administrator lock control level user) as he/she can use different fingers to open and control the biometric lock. For example, if the index finger is cut or otherwise harmed, then the administrator lock control level user could use his/her thumb to open and control the biometric lock.

Thus, an important idea is time saving. During the first registration for the administrator lock control level user, the administrator lock control level user can have 5 times to register the fingerprints. The administrator lock control level user can use 5 different fingers to scan on the panel 40 for this first registration. This means the administrator lock control level user can scan 5 times and have 5 different fingerprints to gain control of the biometric lock.

A main difference from the prior art is that the prior art systems may require the administrator lock control level user to register one fingerprint 5 times. So after 5 scans of the user's administrator lock control level fingerprint, the administrator lock control level user could only gain access with only one fingerprint instead of the additional fingerprints according to the present invention.

Also, during the registration, the biometric lock has a setting, which means that the first person who registers the fingerprints becomes the primary (administrator lock control level) user who has the authority to set secondary lock control level users' fingerprints and delete fingerprints. The second person (normal user) and so on can only register his/her fingerprints and can only open the biometric lock, but cannot set fingerprints of other users or delete other fingerprints of other users. Thus, the setting of the secondary fingerprints (for a normal user) can only be done by that normal user.

Steps for a Normal User (Secondary User), See Operation Below (FIGS. 3A-3D):

1. place the registered administrator lock control level user's fingerprint on the panel 40 and the biometric lock will open and turn on indicating green light 41.

2. keep finger pressed and hold the registered administrator lock control level user's fingerprint for 5 seconds until the blue light turns on as shown in FIG. 3A. Then, the administrator lock control level user needs to place the registered administrator lock control level user's fingerprint on the panel again and the blue light 41 will start blinking as shown in FIG. 3B.

3. then let a normal (secondary) user register a first fingerprint for a normal user fingerprint (secondary lock control level) and the blue light 41 will blink as shown in FIG. 3C (red light 41 will blink if the setting failed).

4. If desired, the normal user could register a second fingerprint for normal user fingerprint and the blue light 41 will blink (red light 41 will blink if the setting failed).

5. If desired, the normal user could register a third fingerprint for normal user fingerprint and the blue light 41 will blink (red light 41 will blink if the setting failed).

6. If desired, the normal user could register a fourth fingerprint for normal user fingerprint and the blue light 41 will blink (red light 41 will blink if the setting failed).

7. If desired, the normal user could register a final fingerprint for normal user fingerprint and the blue light 41 will blink (red light 41 will blink if the setting failed).

8. After these registrations, a green light will turn on to indicate the registration is successfully completed as shown in FIG. 3D.

The above 1-8 steps of setting the secondary lock control level fingerprint(s) must use the administrator lock control level user's registered fingerprints (primary fingerprint(s)) to set the secondary fingerprints. In general, the secondary fingerprints can only open the biometric lock but do not allow this normal user the authority to set and/or delete the other fingerprints of the biometric lock.

Steps for Resetting the Lock to Completely Erase All Fingerprints (FIGS. 4A-4B):

1. Press and hold registered administrator lock control level user's fingerprint on the panel 40 for 8 seconds (for example) until the red light 41 turns on as shown in FIG. 4A.

2. Then, press the registered administrator lock control level user's fingerprint and green light 41 will turn on as shown in FIG. 4B.

3. The padlock is now in factory setting mode. To set the biometric lock, it is necessary to go back to administrator lock control level user's setting (see above).

The above 1-3 steps of resetting the fingerprints must use the administrator lock control level user's registered fingerprint(s) (primary fingerprint(s)) to erase the fingerprints. The secondary fingerprints can only open the biometric lock, but the normal (secondary) user has no rights to set and/or delete the other fingerprints of the biometric lock.

Lock Open Mode FIG. 1:

When the biometric lock has been set with fingerprints, the biometric lock is now able to be opened via the registered fingerprints. The user may place a finger on panel 40. Then the indicating light 41 will turn green. Then the short leg 21 of the shackle 20 will pop out of the lock body 30.

Figure 5:
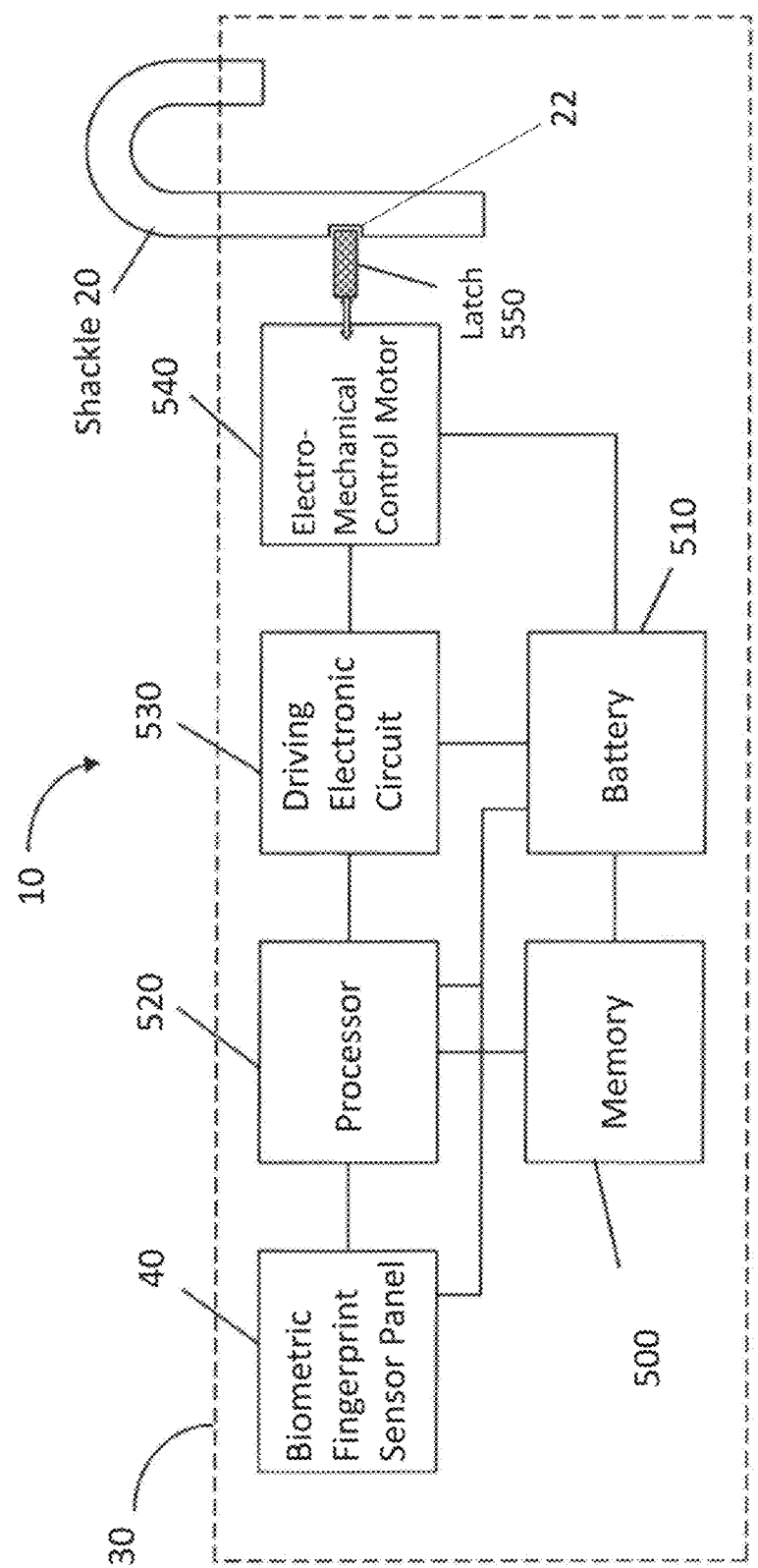
FIG. 5 is a process chart of the lock.
Figure 6:
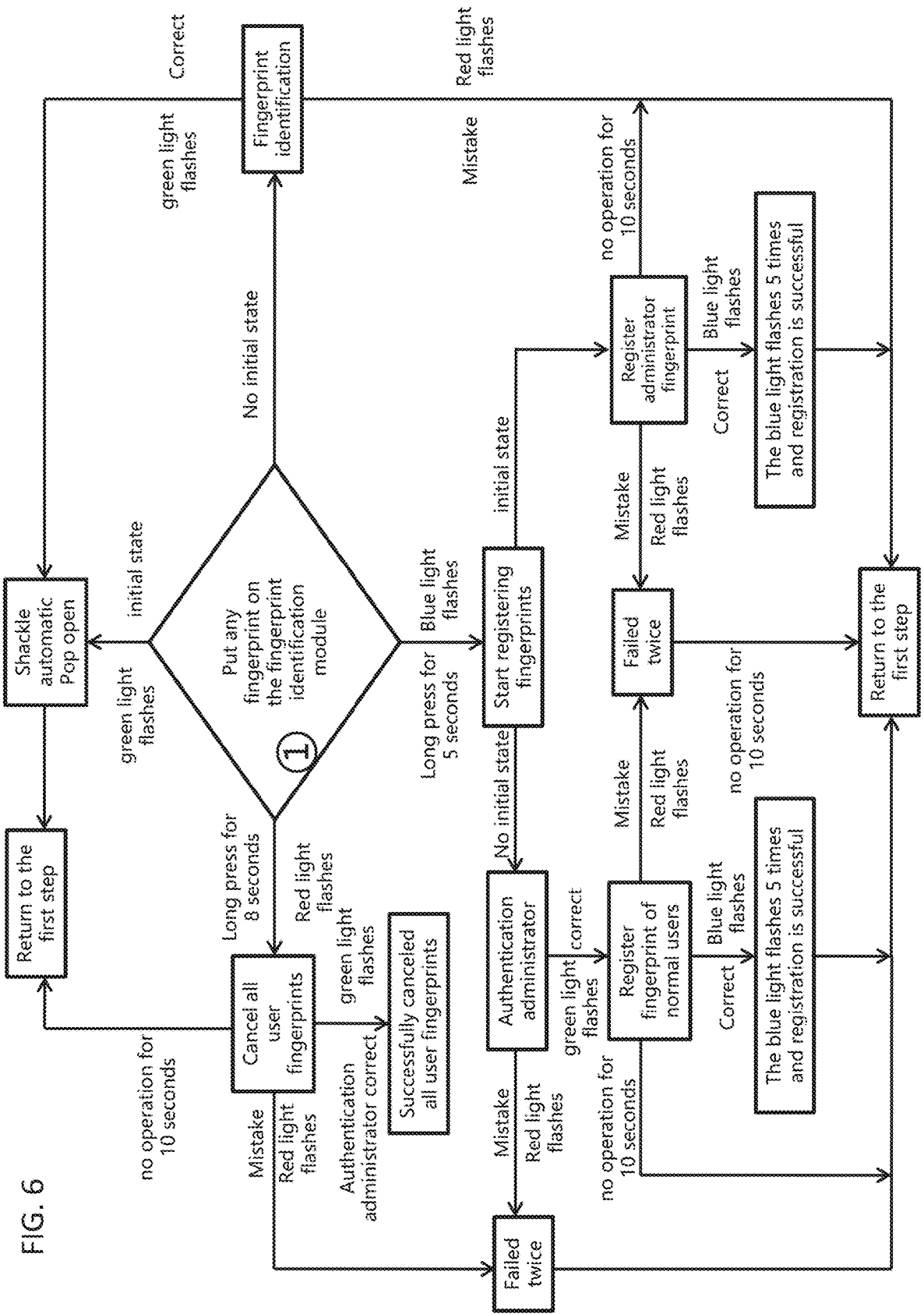
FIG. 6 is a logical flow chart of the lock.

FIG. 5 Process chart and FIG. 6 logical flow chart:

FIG. 5 demonstrates that the biometric lock is in lock state and the latch 550 is engaged to the cutout 22 of the shackle 20 within the lock body 30. With battery 510, if a registered fingerprint is on the biometric fingerprint sensor panel 40, it will cause the processor and memory to identify such fingerprint as to whether it is valid or not. If it is valid, then it allows the electro-mechanical control motor to drive the latch 550 to move away from the cutout 22 of the shackle 20 and the short leg 21 of the shackle 20 can pop out of the body 30.

FIG. 6 is the logical flow chart. This FIG. 6 demonstrates the relationship as described above concerning the setting of the administrative lock control level user, FIGS. 2A-2C, the setting of the normal user, FIGS. 3A-3D, the erasure of all fingerprints, FIGS. 4A-4B, and the lock open mode, FIG. 1.

What is claimed is:

1. A biometric lock comprising:
   a lock body,
   a shackle with a long leg and a short leg, wherein the long leg of the shackle never comes out of the lock, and
   a fingerprint panel wherein the fingerprint panel and an associated memory, battery, and processor are configured to associate a fingerprint of a user to one of a plurality of lock control levels, said associated fingerprint considered a registered fingerprint, wherein each lock control level allows an associated lock control level user to unlock said lock, the lock including a driving electronic circuit, electro-mechanical control motor, and a latch, that are configured to unlock the lock if a registered fingerprint is placed on said fingerprint panel, and
   wherein the fingerprint panel includes indicator lights and wherein the memory, battery and processor are configured to associate at least one fingerprint with an administrator lock control level by:
   place any fingerprint on the panel so that the biometric lock will open and the indicating light will have a green light on,
   press and hold the fingerprint for 5 seconds until a blue light turns on,
   register a first fingerprint for administrator lock control level user's fingerprint and the blue light will blink, wherein a red light will blink if the setting failed,
   if desired, register a second fingerprint for the administrator lock control level user's fingerprint and the blue light will blink, wherein a red light will blink if the setting failed,
   if desired, register a third fingerprint for the administrator lock control level user's fingerprint and the blue light will blink, wherein a red light will blink if the setting failed,
   if desired, register a fourth fingerprint for the administrator lock control level user's fingerprint and the blue light will blink, wherein a red light will blink if the setting failed,
   if desired, register a final fingerprint for the administrator lock control level user's fingerprint and the blue light will blink, wherein a red light will blink if the setting failed, and
   after these registrations, a green light will turn on to indicate the registration is successfully completed.

2. The biometric lock according to claim 1, wherein the highest lock control level is the administrator lock control level that allows an associated user lock control level to perform administrative tasks, including associating fingerprints to lock control levels.

3. The biometric lock according to claim 2, wherein a permanent lock control level requires a user associated with the administrator lock control level to associate a user's fingerprint with the permanent lock level control.

4. The biometric lock according to claim 3, wherein a permanent lock level control allows an associated user to access the biometric lock, but does not allow said user to associate a new fingerprint of another associated user with any lock control level.

5. The biometric lock according to claim 3, wherein the permanent lock control level allows an associated lock control level user to register different fingerprints for said permanent lock control level.

6. The biometric lock according to claim 4, wherein the permanent lock control level allows an associated lock control level user to register the same fingerprints per each registration.

7. The biometric lock according to claim 2, wherein the administrator lock control level allows a plurality of different fingerprints to be associated to lock control levels.

8. The biometric lock according to claim 7, wherein the administrator lock control level allows up to five fingerprints to be assigned to lock control levels.

9. The biometric lock according to claim 2, wherein the administrator lock control level only allows one user's fingerprints to be associated with said administrative lock control level.

10. The biometric lock according to claim 2, wherein the administrator lock control level is the only lock control level that allows an associated lock control level user to erase fingerprints of associated lock control level users of any lock control level.

11. The biometric lock according to claim 2, wherein the biometric lock has a plurality of lock control levels, wherein the biometric lock has 10 registration spaces that can be associated with 10 fingerprints, wherein the first person to register a fingerprint is associated with the administrative lock control level.

12. The biometric lock according to claim 11, wherein the registration of a user to be associated with the administrator lock control level allows more than 1 fingerprint of said user to be associated with the administrative lock control level.

13. The biometric lock according to claim 2, wherein the biometric lock has more than 1 registration space that can be associated with fingerprints.

14. The biometric lock according to claim 2, wherein a secondary lock control level only allows an associated lock control level user to unlock the biometric lock, but does not allow said associated lock control level user to allow others to be associated with any lock control level.

15. The biometric lock according to claim 14, wherein the secondary lock control level does not allow an associated lock control level user to delete a fingerprint of any associated user of any lock control level.

16. The biometric lock according to claim 1, wherein the memory, battery and processor are configured to register a secondary user fingerprint by:
   place the registered administrator lock control level user's fingerprint on the panel and the biometric lock will open and turn on indicating green light,
   keep finger pressed and hold the registered administrator lock control level user's fingerprint for 5 seconds until the blue light turns on, wherein the administrator lock control level user then needs to place the registered administrator lock control level user's fingerprint on the panel again and the blue light will start blinking, let a normal (secondary) lock control level user register a first fingerprint for normal user fingerprint and the blue light will blink, wherein a red light will blink if the setting failed, if desired, the normal user may register a second fingerprint for a normal user fingerprint and the blue light will blink, wherein a red light will blink if the setting failed, if desired, the normal user may register a third fingerprint for normal user fingerprint and the blue light will blink, wherein a red light will blink if the setting failed, if desired, the normal user may register a fourth fingerprint for normal user fingerprint and the blue light will blink, wherein a red light will blink if the setting failed, If desired, the normal user may register a final fingerprint for normal user fingerprint and the blue light will blink, wherein a red light will blink if the setting failed, and After these registrations, a green light will turn on to indicate the registration is successfully completed.

17. The biometric lock according to claim 1, wherein the fingerprint panel, memory, battery, processor, driving electronic circuit, electro-mechanical control motor and latch are configured to open the lock by:

sensing a registered user's fingerprint on the fingerprint panel so as to cause said latch to open the lock.

18. The biometric lock according to claimer 1, wherein the indicator lights indicate the status of the lock.

* * * * *